(12) United States Patent
Yu

(10) Patent No.: US 12,504,105 B2
(45) Date of Patent: Dec. 23, 2025

(54) END FITTING FOR A PIPE AND ASSOCIATED METHODS

(71) Applicant: Polyflow, LLC, Midland, TX (US)

(72) Inventor: Liang Yu, Midland, TX (US)

(73) Assignee: Polyflow, LLC, Midland, TX (US)

( * ) Notice: Subject to any disclaimer, the term of this patent is extended or adjusted under 35 U.S.C. 154(b) by 171 days.

(21) Appl. No.: 17/829,803

(22) Filed: Jun. 1, 2022

(65) Prior Publication Data

US 2023/0392729 A1 Dec. 7, 2023

(51) Int. Cl.
*F16L 33/16* (2006.01)
*F16L 33/18* (2006.01)
*F16L 33/22* (2006.01)

(52) U.S. Cl.
CPC ............... *F16L 33/16* (2013.01); *F16L 33/18* (2013.01); *F16L 33/222* (2013.01)

(58) Field of Classification Search
CPC .......... F16L 33/16; F16L 33/18; F16L 33/222
See application file for complete search history.

(56) References Cited

U.S. PATENT DOCUMENTS

| | | | | |
|---|---|---|---|---|
| 2,015,081 A | * | 9/1935 | McElhany | F16L 33/213 |
| | | | | 285/259 |
| 3,989,281 A | * | 11/1976 | Wilde, Jr. | F16L 58/181 |
| | | | | 174/84 R |
| 4,114,654 A | * | 9/1978 | Richardson | F16L 13/11 |
| | | | | 165/76 |
| 4,648,626 A | | 3/1987 | Vinciguerra et al. | |
| 4,887,846 A | | 12/1989 | Chin et al. | |
| 6,595,559 B1 | * | 7/2003 | Readman | F16L 13/141 |
| | | | | 285/382 |
| 8,419,071 B2 | * | 4/2013 | Gentille | F16L 33/01 |
| | | | | 285/97 |
| 2003/0107219 A1 | * | 6/2003 | Hoppenz | B29C 66/7212 |
| | | | | 285/285.1 |
| 2012/0043752 A1 | * | 2/2012 | McPherson | B29C 65/483 |
| | | | | 285/285.1 |
| 2021/0033223 A1 | * | 2/2021 | Baldwin | F16L 33/34 |

FOREIGN PATENT DOCUMENTS

| | | |
|---|---|---|
| KR | 102327034 B1 | 11/2021 |
| WO | 9321099 A1 | 10/1993 |

* cited by examiner

*Primary Examiner* — James M Hewitt, II
(74) *Attorney, Agent, or Firm* — E. Eric Mills; Nicholas P. Stadnyk; Maynard Nexsen PC

(57) ABSTRACT

An end fitting for connecting two sections of pipe to one another can comprise a first tubular member, and a second tubular member disposed coaxially about the first tubular member to delimit an annular gap therebetween for receiving an end portion of a pipe. A sleeve can be disposed coaxially about the first tubular member and within the annular gap such that a pressurised medium is receivable between the sleeve and one of first and second tubular members to move at least a portion of the sleeve radially and thereby clamp the end portion of the pipe between the first and second tubular members when received in the annular gap. The end fitting may have particular application in conveying oil and gas field fluids, including hydrocarbon fluids.

11 Claims, 3 Drawing Sheets

END FITTING FOR A PIPE AND ASSOCIATED METHODS

TECHNICAL FIELD

The invention relates to an end fitting for a pipe and associated methods. Particularly, though not exclusively, the invention relates to an end fitting for connecting two sections of flexible composite pipe to one another, and methods of connecting an end fitting to an end of a flexible composite pipe.

BACKGROUND

Flexible composite pipe has been replacing steel in many applications with great success, including oil and gas pipelines, due to its versatility and durability. Flexible composite pipe is used in conveying oil and gas field fluids, such as water, gas (for example methane, ethane, $CO_2$) and hydrocarbon fluids, or other fluids such as hydrogen, and is typically used onshore or in shallow water applications (for example, less than 500 m water depth).

Reinforced thermoplastic pipe (RTP) is an example of a multi-layer flexible composite pipe reinforced by high-strength materials. RTP is suited to gas and oil transportation because of its ultra-low permeability and high strength, being capable of internal pressures exceeding 5,000 psi (~34.5 MPa), and may be qualified and supplied in accordance with the American Petroleum Institute specification API 15S. RTP is corrosion-resistant and more durable than steel pipe: RTP can withstand salt corrosion, as well as $H_2S/CO_2$ corrosion, hence contributing to a longer lifespan when compared to steel pipe. Moreover, RTP can provide high flowrates due to a smooth inner surface and the inherent flexibility of the pipe, which removes the need for elbows.

RTP may comprise a multi-layer pipe wall structure, incorporating at least one reinforcement layer to withstand internal pressure and/or tension in the pipe when in use. The multi-layer pipe wall structure may comprise an inner liner of polymer, an intermediate reinforcement layer and an outer protective polymeric sheath layer. The inner liner layer may comprise a single layer and material or a plurality of sub-layers co-extruded or co-axially extruded over each other with optional tie layers to ensure bonding between incompatible polymer layers. RTP may be manufactured from MDPE, HDPE, XLPE, PE-RT, polyamides (for example PA-12, PA-11, PA-66, PA-6), thermoplastic elastomers, flexible polyvinyl chloride, acrylonitrile butadiene styrene (ABS), polyphenylene sulphide (PPS), or other polymers or polymer alloys. RTP may comprise filled polymers where the polymer contains a portion of a filler material, such as fibres or particles. RTP may comprise one or more intermediate reinforcement layers which comprise long fibres, fibre strands, braids and the like, the filaments of which may be from one or more of glass, carbon, aramid, basalt, or polyester, and which may also comprise a matrix material of a thermoplastic polymer. Fibres and/or strands or braids of fibres may be wound around the pipe in a helical manner, with lay angles optimised for pipe performance (the higher the angle the greater the pressure retainment capability, the lower the angle the greater the tension capability), or interwoven into a braid around the liner pipe. Multiple layers of reinforcement may be applied sequentially at different lay angles to optimise and provide torsional balance to the structure in manufacture and use.

RTP may be either of an unbonded construction, where the layers of the pipe are unbonded to each other, i.e. the inner fluid containing polymer liner layer is not bonded to the reinforcement layer, which is in turn not bonded to the outer protective sheath polymer layer, or of a bonded construction, i.e. all layers are bonded to each other as part of the pipe manufacturing resulting in a pipe which is in effect a single, consolidated layer comprising sub-layers. Unbonded RTP may be suitable for similar applications to bonded RTP, but is manufactured differently. In comparison with bonded RTP, unbonded RTP may be manufactured more quickly (as there is no need to bond or consolidate layers along the full length of the pipe, nor additional inspection to confirm such bonding is achieved), and is therefore more cost effective, and results in a pipe which is more flexible during handling and installation, being able to maintain and operate at a smaller bend radius without risk of damage to the pipe structure. An end fitting, or coupling, provides a sealing transition between the pipe and a connecting component, and transmits normal service loads acting on the pipe without allowing the pipe to fail. End fittings may be used for connecting sections of RTP to one another or for connecting a section of RTP to, for example, terminal equipment. As such, RTP can be used, inter alia, to provide a flexible composite pipe assembly for transporting fluids from a well-head location to an export terminus, or to a refinery. In such a pipe assembly, a first section of RTP may be connected to one or more further sections of RTP. Each section of RTP may include at least one end fitting.

It can be challenging to create the required sealing and anchor performance: the end fitting to pipe transition may be the weakest point in a pipeline. End fittings and methods of joining sections of RTP must withstand anticipated pressures. Even a relatively low operating pressure (maximum pressure of the fluid conveyed in the pipe) can include pressures up to 3,000 psi (~21 MPa). Moreover, exposure of the pressurised fluid contained in the pipe to the reinforcing fibres should be prevented, as otherwise the strength of the fibres can degrade, and/or cause accumulation of the pressurised fluid in voids in the reinforcing layer. Such accumulated pressure can cause separation of the pipe layers, for example that can occur when de-pressurising a gas filled pipe.

Moreover, the end of the pipe, where the connection between the pipe and the end fitting is made, may be subjected to various types of loading during use. It is therefore important to ensure that the connection between the end fitting and the end of the pipe remains secure, does not suffer unduly from age-related deterioration or failure, nor induces additional stress or damage into the reinforcement layer(s).

Known methods of connecting an end fitting to an end of a pipe include crimping and swaging, in which a mechanical or hydraulic tool compresses and/or otherwise deforms the end fitting about the end of the pipe, creating a connection therebetween. The tools are specialist, heavy and typically need reconfiguration or replacement for use with different types and sizes of end fitting. Undesirably, crimping and swaging can compress the pipe, which can cause damage and undesirable deformation to the pipe: during the crimping or swaging process, there is a risk that elements of the reinforcement layer(s) in the pipe are damaged, reducing their strength and ability to withstand both pressure loading and tension forces in the pipe during service. For RTP specifically, helically wound reinforcement tape layers may, during the end fitting application process, become displaced with respect to their designed or optimum configuration, as well as the fibres which reinforce the tapes being damaged, reducing their strength and consequently the pressure retainment capacity of the pipe. A specific issue with the termination of RTP is being able to create and maintain a seal against the inner polymer fluid barrier layer while at the same time ensuring the securing of the reinforcing layer within the end fitting, and controlling the transition of strain in the pipe as it body transitions out from the constraints of the end fitting.

It is an object of embodiments of the invention to provide an improved end fitting for connecting two sections of pipe to one another, and/or at least mitigate one or more problems associated with known arrangements.

SUMMARY OF THE INVENTION

According to a first aspect of the invention, there is provided an end fitting for connecting two sections of pipe to one another, the end fitting comprising: a first tubular member; a second tubular member disposed coaxially about the first tubular member to delimit an annular gap therebetween for receiving an end portion of a pipe; and a sleeve disposed coaxially about the first tubular member and within the annular gap such that a pressurised medium is receivable between the sleeve and one of first and second tubular members to move at least a portion of the sleeve radially and thereby clamp, i.e. generate a compression pressure on, the end portion of the pipe between the first and second tubular members when received in the annular gap.

This arrangement may negate the need for specialist equipment for making a connection between the end fitting and an end of a pipe. Additionally, or alternatively, the arrangement may reduce end fitting costs and/or the time required to install an end fitting to an end of a pipe, in particular when providing a pipe assembly comprising RTP. Additionally, or alternatively, the arrangement may reduce the risk of damage to a pipe during installation of an end fitting to an end of a pipe, including the risk of damage to a reinforcement layer of the pipe, in particular when providing a pipe assembly comprising RTP. Additionally, or alternatively, when connecting to unbonded RTP, the arrangement may help to ensure the securing of the reinforcing layer within the end fitting.

In certain embodiments, the pressurised medium may be receivable between the sleeve and the first tubular member to move the at least a portion of the sleeve radially outward to thereby clamp an end portion of the pipe. Alternatively, the pressurised medium may be receivable between the sleeve and the second tubular member to move the at least a portion of the sleeve radially inward to thereby clamp the end of the pipe.

In certain embodiments, one of (as used herein to be understood to mean at least one of) the first tubular member, the second tubular member and the sleeve may comprise one or more of radially projecting teeth or knurls, surface undulations and recesses for O-rings. Such arrangements may facilitate gripping of the pipe when clamped between the first and second tubular members.

In certain embodiments, wherein one of the first tubular member, the second tubular member and the sleeve comprise or may be formed of one or more of a metallic material, steel, aluminium, copper brass, a reinforced or non-reinforced thermoplastic polymer, a reinforced or non-reinforced thermoset polymer, and a composite material.

In certain embodiments, the sleeve may be sealingly attached to one of the first and second tubular members about a circumference thereof at a first location along a length of the one of the first and second tubular members. Additionally, the sleeve may be sealingly attached to the one of the first and second tubular members about a circumference thereof at a second location along a length of the one of the first and second tubular members to provide a sealable enclosure for receiving the pressurised medium delimited, at least in part, by the sleeve and the one of the first and second tubular members.

In certain embodiments, one of the first tubular member, the second tubular member and the sleeve may comprise a valve for introducing the pressurised medium between the sleeve and one of first and second tubular members.

In certain embodiments, the end fitting may comprise a further sleeve disposed coaxially about the sleeve and within the annular gap such that a further pressurised medium is receivable between the further sleeve and the second tubular member to move at least a portion of the further sleeve radially inward to thereby clamp the end portion of the pipe.

In certain embodiments, the further sleeve may comprise one or more of radially projecting teeth or knurls, surface undulations and recesses for O-rings. The further sleeve may be formed of one or more of a metallic material, steel, aluminium, copper brass, a reinforced or non-reinforced thermoplastic polymer, a reinforced or non-reinforced thermoset polymer, and a composite material.

In certain embodiments, the further sleeve may be sealingly attached to one of the first and second tubular members about a circumference thereof at a first location along a length of the one of the first and second tubular members. Additionally, the further sleeve may be sealingly attached to the one of the first and second tubular members about a circumference thereof at a second location along a length of the one of the first and second tubular members to provide a sealable enclosure for receiving the pressurised medium delimited, at least in part, by the further sleeve and the one of the first and second tubular members. In certain embodiments, one of the further sleeve may comprise a valve for introducing the pressurised medium between the sleeve and one of first and second tubular members.

According to a further aspect of the invention, there is provided a method of connecting an end fitting to an end of a pipe, the method comprising the steps of: providing an end fitting as described above; locating an end portion of a pipe in the annular gap; and delivering a medium under pressure between the sleeve and one of first and second tubular members to move the at least a portion of the sleeve radially and thereby clamp the end portion of the pipe between the first and second tubular members. This method may have the same benefits as described in relation to the above aspect of the invention.

In certain embodiments, the medium may comprise one or more of a thermosetting polymer with or without fillers, a hydraulic oil, a hydrocarbon oil, a cement, a thermoplastic polymer with or without fillers, a liquid metal, water, an adhesive material and a caulking material. Additionally, or alternatively, the medium may comprise one of a fibre reinforcement, a filler and a self-expanding material.

In certain embodiments, delivering the medium under pressure may comprise delivering the medium under a pressure in excess of 100 psi (~700 kPa) and/or up to 20,000 psi (~140 MPa). Additionally, or alternatively, the method may comprise the step of maintaining pressure in the medium for a predetermined period of time to fix the radial movement of the at least a portion of the sleeve. Maintaining pressure in the medium may comprise maintaining a pressure in excess of 100 psi (~700 kPa) and/or up to 20,000 psi (~140 MPa).

According to a further aspect of the invention, there is provided a method of connecting an end fitting to an end of a pipe, the method comprising the steps of: providing an end fitting as described above; locating an end portion of a pipe in the annular gap; and delivering a medium under pressure between the sleeve and the first tubular member and a further medium under pressure between the sleeve and the second tubular member to move each of the at least a portion of the sleeve and the at least a portion of the further sleeve radially and thereby clamp the end of the pipe between the first and second tubular members. This method may have the same benefits as described in relation to the above aspects of the invention.

In certain embodiments, delivering the medium under pressure may be commenced prior to commencing delivering the further medium under pressure. Additionally, or alternatively, delivering the medium under pressure may be completed prior to commencing delivering the further medium under pressure, and/or delivering the medium under pressure may comprise delivering the medium under a first pressure greater than a second pressure in delivering the further medium under pressure. In certain embodiments, delivering the medium under pressure and delivering the further medium under pressure may be commenced and/or carried out simultaneously. Controlling respective pressure may further help to achieve a desired internal and/or external diameter of the pipe.

In certain embodiments, the further medium may comprise one or more of a thermosetting polymer with or without fillers, a hydraulic oil, a hydrocarbon oil, a cement, a thermoplastic polymer with or without fillers, a liquid metal, water, an adhesive material and a caulking material. Additionally, or alternatively, the further medium may comprise one of a fibre reinforcement, a filler and a self-expanding material. The medium and the further medium may be substantially the same as one another.

In certain embodiments, delivering the medium under pressure and/or delivering the further medium under pressure may comprise delivering the medium under a pressure in excess of 100 psi (~700 kPa) and/or up to 20,000 psi (~140 MPa). Additionally, or alternatively, the method may comprise the step of maintaining pressure in the medium and/or the further medium for a predetermined period of time to fix the radial movement of the at least a portion of the sleeve. Maintaining pressure in the medium and/or the further medium may comprise maintaining a pressure in excess of 100 psi (~700 kPa) and/or up to 20,000 psi (~140 MPa).

According to a further aspect of the invention there is provided a pipe assembly comprising a pipe and an end fitting as described above. In certain embodiments, the pipe may be bonded or unbonded reinforced thermoplastic pipe (RTP).

The features of all the above-described embodiments are intended to be combinable with one another, unless mutually exclusive.

BRIEF DESCRIPTION OF THE DRAWINGS

Embodiments of the invention will now be described, by way of example only, with reference to the accompanying figures, in which.

DETAILED DESCRIPTION OF EMBODIMENTS OF THE INVENTION

Figure 1:
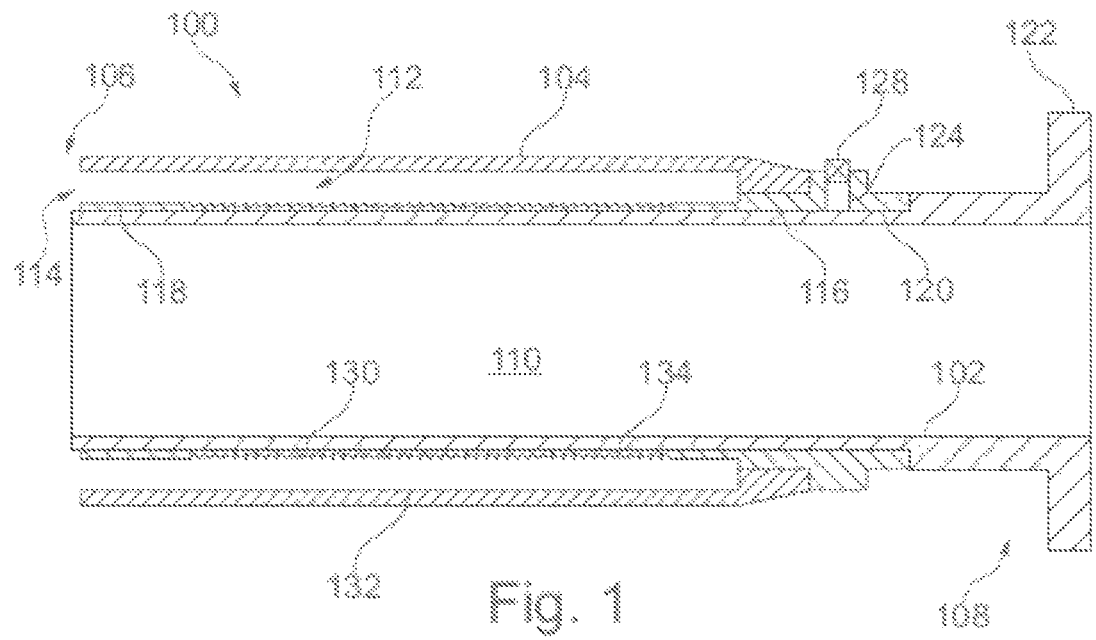
FIG. 1 is a cross-sectional schematic view of an end fitting for connecting two sections of a pipe, the end fitting according to an embodiment of the invention.
Figure 3:
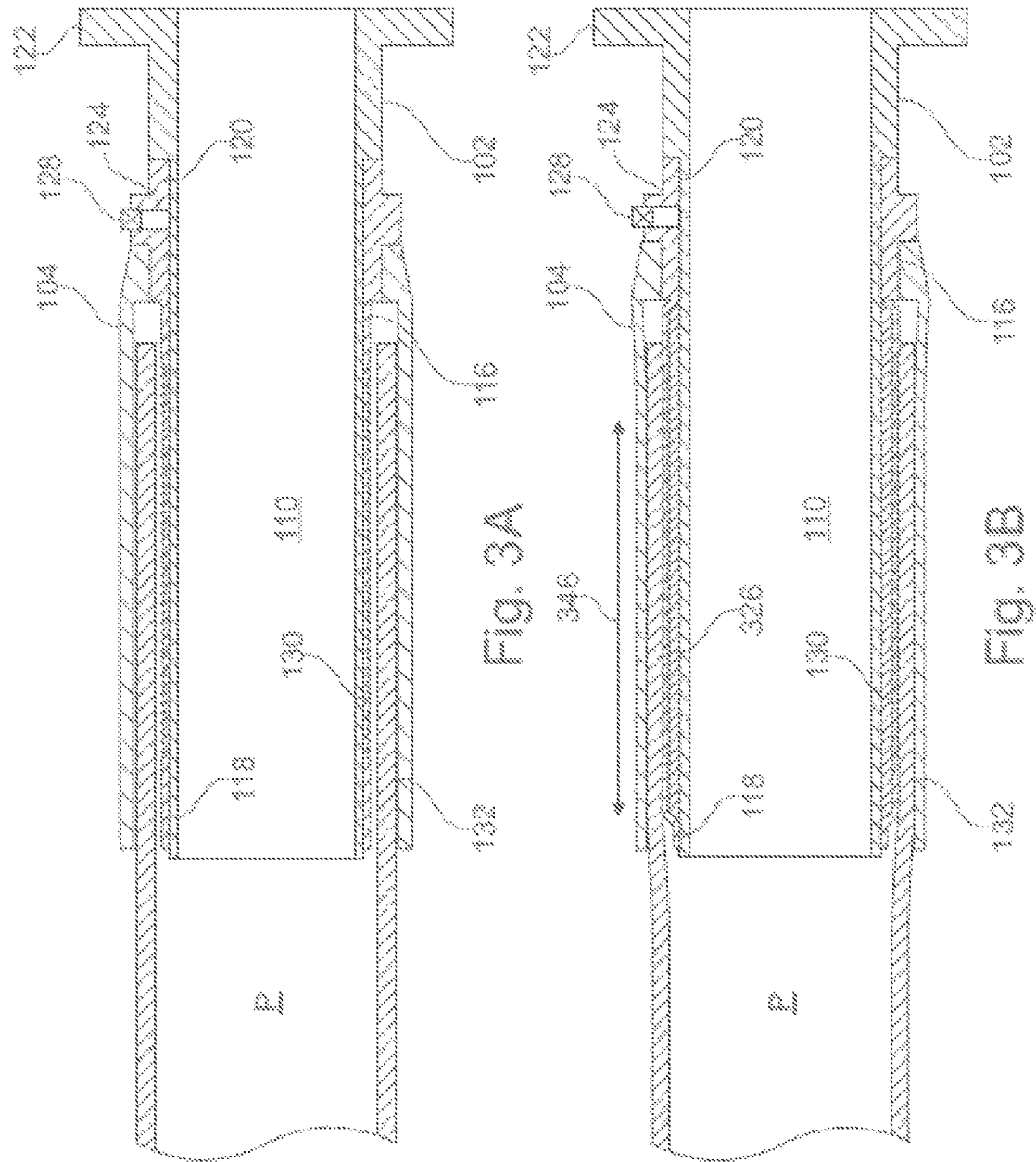
FIG. 3A is cross-sectional schematic view of the end fitting of FIG. 1 showing an end of a pipe located within, but not connected to, the end fitting.
FIG. 3B is cross-sectional schematic view of the end fitting of FIG. 1 showing the end of the pipe located within, and connected to, the end fitting.

FIGS. 1, 3A and 3B illustrate an end fitting 100 according to an embodiment of the invention. The end fitting 100 may have particular application in conveying oil and/or gas field fluids, such as water, gas (for example methane, ethane, $CO_2$), and hydrocarbon fluids, or other fluids such as hydrogen. Moreover, the end fitting 100 may have particular application in onshore, shallow water and/or very shallow water applications. As used herein, shallow water is to be understood include water depths of up to 500 m, and very shallow water is to be understood to include water depths of up to 50 m. The end fitting 100 may have particular application for use with a multi-layer flexible composite pipe, such as RTP. However, the end fitting 100 may be equally applicable for use with flexible composite pipe of a uniform mono-structure (the pipe structure comprises no reinforcement, e.g. only composite material) The end fitting 100 is configured to receive a pipe P (shown in FIGS. 3A and 3B) and may provide a seal between the pipe P and a connecting component (not shown), which may be a further end fitting, or terminal equipment, and/or transmit loads acting on the pipe P.

The end fitting 100 includes a first tubular member, provided as a stem 102, and a second tubular member, provided as a ferrule 104. In the illustrated embodiment, the stem 102 extends from a first end 106 of the end fitting 100 to an opposing second end 108. As used herein, reference to a proximal end, location, etc. is to be understood to mean towards, at or near the first end 106, the first end being that at which the pipe P is received by the end fitting 100, and reference to a distal end, location, etc. is to be understood to mean towards, at or near the second end 108. The stem 102 comprises a bore 110 extending through the centre thereof for conveying a fluid. The bore 110 is open at each of its proximal and distal ends. The ferrule 104 is disposed coaxially about the stem 102 in a manner that delimits an annular gap 112 extending radially between the stem 102 and the ferrule 104. The annular gap 112 extends along a length of the end fitting 100, and is accessible at least by an opening 114 at its proximal end. Through the opening 114, the pipe P is receivable within the annular gap 112 to be received by the end fitting 100.

The end fitting 100 further includes a sleeve 116 disposed coaxially about the stem 102 and, at least partially, within the annular gap 112. In the illustrated embodiment, the sleeve 116 fits closely about the stem 102 such that, at least prior to connection of the end fitting 100 to the pipe P, there is little or no gap extending radially between the stem 102 and the sleeve 116. However, in certain embodiments, such a gap between the stem 102 and the sleeve 116 may be provided. The proximal end of the sleeve 116 is sealingly attached to the stem 102 about an outer circumference thereof at a first location 118 along the length of the stem 102. The first location 118 may be at or near to the first end 106 of the end fitting 100. In the illustrated embodiment, the first location 118 is at the proximal end of the stem 102.

The sleeve 116 is further sealingly attached to the stem 102 about an outer circumference thereof at a second location 120 along the length of the stem 102. As such, between the first and second locations 118, 120 the stem 102 and the sleeve 116 together delimit a sealable enclosure, or pocket. The second location 120 may be at or near to the second end 108 of the end fitting 100. In the illustrated embodiment, the second location 120 is between the distal end of the ferrule 104 and the distal end of the stem 102. As such, the sleeve 116 extends along a length of the end fitting 100 within the annular gap 112, and along a further length of the end fitting 100 beyond the distal end of the annular gap 112. In such embodiments, the ferrule 104 is attached to the sleeve 102. However, in certain embodiments, the sleeve 116 may be contained wholly within the annular gap 112. In such embodiments, the ferrule 104 may be attached to the stem 102. In either case, attachment of the ferrule 104 is made at its distal end.

The invention is not limited by particular means of attachment between components, and any suitable means of attachment may be used. However, it is contemplated that attachment of the sleeve 116, for example attachment of the sleeve 116 to the stem 102 may be by welding, and attachment of the ferrule 104, for example attachment of the ferrule 104 to one of the sleeve 116 and the stem 102, may be by threaded engagement. As such, in certain embodiments, the ferrule 104 and the sleeve 116 may have respective cooperating threaded portions. In certain embodiments, for example in which the sleeve 116 and/or the ferrule 104 are not formed of a metal, attachment of the sleeve at one or both of the first and second ends 106, 108 can be achieved by one, or a combination, of adhesion, sealing O-rings and annular securing collars.

The stem 102 may comprise a flange 122 at its distal end. The flange 122 may facilitate connection of the end fitting 100 to a connecting component, for example a further end fitting. The flange 122 may be configured to provide a bolted or welded connection, for example. However, other means of connection are contemplated, for example the distal end of the stem 102 may comprise a threaded portion (not shown) for threaded engagement with a connecting component. Means of connection of the end fitting 100 to a connecting component may be provide by conventional means in the art.

An inlet 124 may be provided in the sleeve 116 through which a pressurised medium 326 (shown in FIG. 3B) may be delivered between the stem 102 and the sleeve 116, i.e. to be received in the sealable enclosure. As described in more detail below, the pressurised medium 326 may be delivered between the stem 102 and the sleeve 116 to move at least a portion of the sleeve 116 radially outward and thereby clamp an end portion of the pipe P between the stem 102 and the ferrule 104. In certain embodiments, the inlet 124 may be alternatively provided, for example in the stem 102, and/or in multiple components of the end fitting 100, for example in both of the ferrule 104 and the sleeve 116. A valve 128 may be disposed within the inlet 124. The valve 128 may be a one-way valve arranged to allow flow of the pressurised medium 326 through the opening 110 to between the stem 102 and the sleeve 116, and to inhibit flow of the pressurised medium 326 through the opening 110 from between the stem 102 and the sleeve 116, i.e. to seal the sealable enclosure.

A surface of the sleeve 116 may provide a first clamping surface 130, i.e. a surface for contacting the end portion of the pipe P to effect clamping thereof. A second clamping surface 132 may be provided by a surface of the ferrule 104. The first and/or second clamping surfaces 130, 132 may include radially projecting surface features 134 to facilitate clamping of the pipe P, for example teeth and/or knurls. The surface features 134 may project radially from the sleeve 116, i.e. project into the annular gap 112, to engage the pipe P and thereby effect clamping thereof. The surface features 134 may extend along a length of the first and/or second clamping surfaces 130, 132, and may extend circumferentially, wholly or partially, about a circumference of the first and/or second clamping surfaces 130, 132. In certain embodiments, there may be multiple spaced apart regions of the surface features 134, spaced apart along a length of the first and/or second clamping surfaces 130, 132, and/or spaced circumferentially about the first and/or second clamping surfaces 130, 132. The surface features 134 may be homogenous, or may vary by type, size and/or spacing. The surface features 134 may be angled to inhibit pull-out of the pipe P when the end portion thereof is clamped between the stem 102 and the ferrule 104.

In certain embodiments, the surface features 134 may vary in section the thickness of the sleeve 116 such that radial expansion of the sleeve may vary along its axial length, allowing the material of the pipe body to flow and be compressed to different degrees along the axial length of the end fitting 100. This feature can have an advantageous effect on the way in which the pipe is held in the end fitting 100 and how reinforcements of the pipe P are affected by the clamping force during the process of attaching the end fitting 100, increasing the tortuosity of the annular gap 112.

Figure 2:
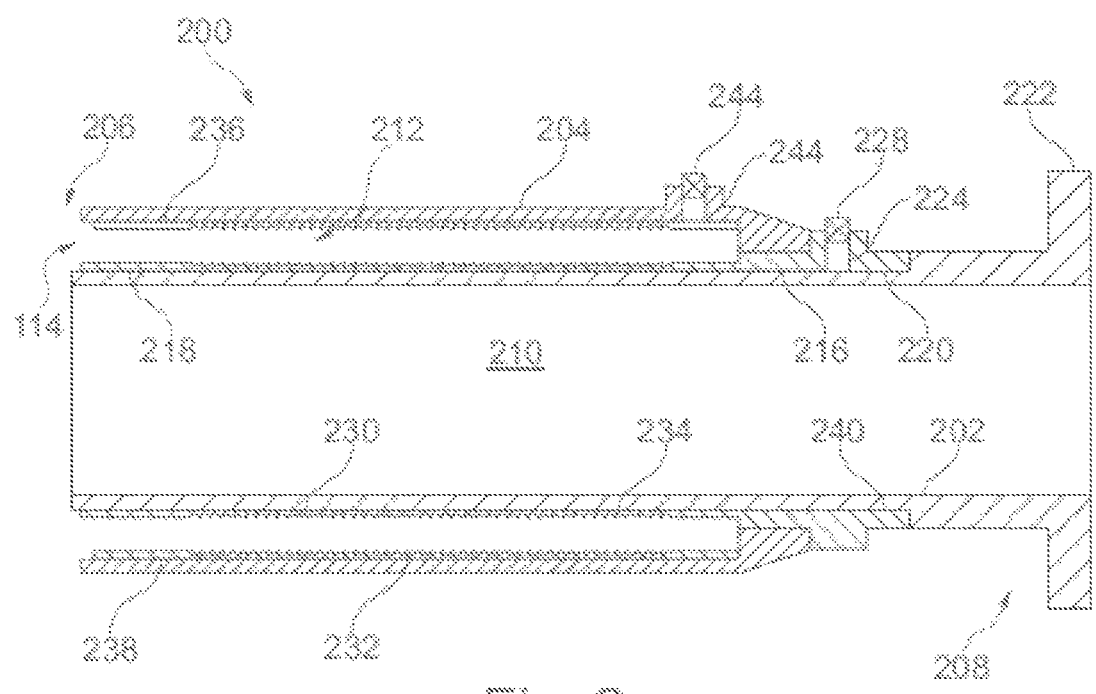
FIG. 2 is a cross-sectional schematic view of an end fitting for connecting two sections of a pipe, the end fitting according to a further embodiment of the invention.

Turning to FIG. 2, there is illustrated an end fitting 200 according to an alternative embodiment of the invention, though the same reference numerals, offset by a factor of 100, are used to identify the same or similar features as described above. Again, the end fitting 200 may have particular application in conveying oil and/or gas field fluids, and/or may have particular application in onshore, shallow water and/or very shallow water applications.

The end fitting 200 includes a further sleeve 236. The further sleeve 236 is disposed coaxially about the sleeve 216 and, at least partially, within the annular gap 212. As shown in the illustrated embodiment, the ferrule 204 may fit closely about the further sleeve 236 such that, at least prior to connection of the end fitting 200 to the pipe P, there is little or no gap extending radially between the ferrule 204 and the further sleeve 236. However, in certain embodiments, a gap between the ferrule 204 and the further sleeve 236 may be provided.

The proximal end of the further sleeve 236 is sealingly attached to the ferrule 204 about an inner circumference thereof at a first location 238 along the length of the ferrule 204. The first location 238 may be at or near to the first end 206 of the end fitting 200.

In the illustrated embodiment, the first location 238 is at the proximal end of the ferrule 204. The further sleeve 236 is further sealingly attached to the ferrule 204 about an inner circumference thereof at a second location 240 along the length of the ferrule 204. As such, between the first and second locations 238, 240 the ferrule 204 and the further sleeve 236 together delimit a further sealable enclosure, or pocket The second location 240 may be at or near to the second end 208 of the end fitting 100. In the illustrated embodiment, the second location 238 is at the distal end of the ferrule 204.

A further inlet 242 may be provided in the ferrule 204, in addition to the inlet 224 that may be provided in the sleeve 216. Through the further inlet 242, a further pressurised medium, which may be the same as, or different to, the pressurised medium 326 described above, may be delivered between the ferrule 204 and the further sleeve 236. The further pressurised medium may be delivered between the ferrule 204 and the further sleeve 236 to move at least a portion of the further sleeve 236 radially inward and thereby clamp the end of the pipe P between the stem 102 and the ferrule 104, i.e. movement of the both sleeve 216 and the further sleeve 236 clamps the pipe P between the stem 202 and the ferrule 204. A further one-way valve 244 may be disposed within the further inlet 242 and may be arranged to function at least similarly to the one-way valve 328, though with respect to the further sleeve 236 and the ferrule 204.

FIGS. 3A and 3B illustrate the end fitting 100 in use, in an unconnected state and a connected state, respectively.

FIG. 3A illustrates the pipe P received in the annular gap 112. Consequently, the stem 102 and the sleeve 116 extend into the pipe. In the illustrated embodiment, the first and second clamping surfaces 130, 132, provided by the sleeve 116 and the ferrule 104, respectively, are spaced apart such that the pipe P, or more specifically an end portion of the pipe P, can be located easily in the annular gap 112, and be removed easily therefrom also. The end fitting 100 may be configured, for example the dimensions of the sleeve 116 and the ferrule 104 may be predetermined, such that the end portion of the pipe P may be received by the end fitting 100 with little or no frictional resistance occurring therebetween. In certain embodiments, a degree of fictional resistance may be desirable to support the pipe P within the end fitting 100 while the connection therebetween is made. As such, the end fitting 100 may be configured to provide such frictional resistance.

FIG. 3B illustrates the pressurised medium 326 received between the stem 102 and the sleeve 116. In contrast to FIG. 3A, the sleeve 116 has moved radially outward and thereby clamped the pipe P between the stem 102 and ferrule 104. Such movement of the sleeve 116 may be deformation of the sleeve 108, for example elastic and/or plastic deformation. The sleeve 116 may be displaced and/or deformed by the pressurised medium 326 to clamp the pipe P between the stem 102 and the ferrule 104. Together, the first and second clamping surfaces 130, 132 exert radial clamping, or gripping, forces along a contact length 346 of the pipe P to retain the end of the pipe P in the annular gap 116, and thus connect the end fitting 100 to the pipe P. The connection formed may provide a fluid tight seal between the end fitting 100 and the pipe P and/or may enable loads acting on the pipe P to be transmitted through the end fitting 100. As shown in the illustrated embodiment, the pipe P may be deformed by the clamping force exerted by the sleeve 116. As shown in the illustrated embodiment also, the ferrule 104 may be deformed by the medium being received between the stem 102 and the sleeve 116.

Exemplary dimensions of the end fitting 100 for a pipe P having a nominal 4 inch (nominal 100 mm) diameter and 0.237 inch (6.02 mm) wall thickness may be as follows:

| | |
|---|---|
| External diameter of the stem 102 | 3.51 inches (89.15 mm) |
| Internal diameter of the sleeve 116 | 3.52 inches (89.41 mm) |
| External diameter of the sleeve 116 | 3.82 inches (97.03 mm) |
| Internal diameter of the ferrule 104 | 4.93 inches (125.30 mm) |
| Contact length 346 | 12.5 inches (317.5 mm) |

However, it is to be understood that the dimensions of the end fitting 100 may be varied to accommodate different sized pipes and/or for different applications. The end fitting 100 may be suitable for connecting to pipes between 2 inches and 32 inches internal diameter, and pressures of between 200 psi and 5000 psi. The end fitting 100 may be particularly suitable for connecting to pipes having 4 inch, 6 inch or 8 inch nominal internal diameter.

The medium 326 may be any suitable medium, and may be a mixture of one or more fluids. Examples of suitable media include a thermosetting or otherwise curable polymer, a hydraulic oil, a hydrocarbon oil, a cement, a thermoplastic polymer, a liquid metal, water, an adhesive material and a caulking material. An example of a suitable type of two-part epoxy potting compound which may be used as the pressurized medium 326 is Epoxy Material Grade Araldite XD 4804 A/B from Huntsman Corporation. A further example of a pressurised medium is epoxy Belzona 1983, available from Belzona International Limited. Moreover, the medium 326 may further comprise a fibre reinforcement, a filler and/or a self-expanding material, for example a self-expanding foam.

The end fitting 100, and/or components thereof, may be formed of a carbon steel tube, for example of API 5L grade X42, or grade AISI or SAE 1026, or may be made of stainless steel, for instance grade 316L or duplex stainless steel for instance lean duplex grade UNS S32101. However, any suitable materials may be used. In certain embodiments, an inner, sometimes referred to as a "wetted", portion of the end fitting bore may be clad with a corrosion resistant alloy material, for example by weld cladding, or roll-bonding or similar, in order to add corrosion protection to the base material of the end fitting. Materials may be selected that resist microbially induced corrosion (MIC), oxygen-related corrosion, galvanic corrosion and/or under-deposit corrosion, while providing the required mechanical properties, for example strength and elasticity, for the intended application. Alternative materials contemplated include thermoplastics and reinforced cements. In certain embodiments, the end fitting 100 may be zinc plated. In certain embodiments, the end fitting 100 may be painted with a corrosion barrier coating on the external surfaces, for example an epoxy or acrylic system provided by Interlux Corp.

Figure 4:
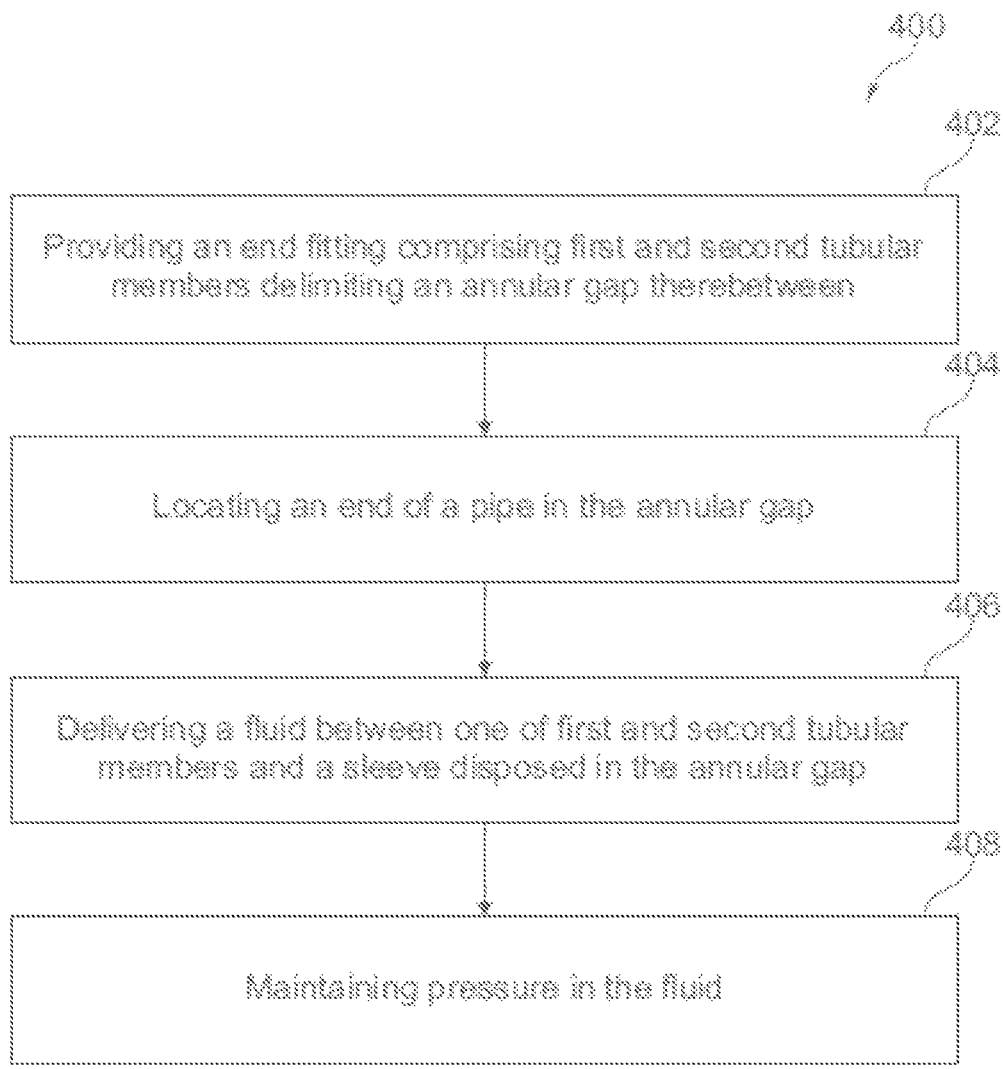
FIG. 4 is a flowchart of a method of connecting an end fitting to an end of a pipe, the method according to an embodiment of the invention.

FIG. 4 illustrates a method 400 of connecting an end fitting to an end of a pipe, the method according to embodiment of the invention. Similarly to the end fittings 100, 200 described above with reference to FIGS. 1 and 2, the method 400 may have particular application in conveying oil and/or gas field fluids, and/or may have particular application in onshore, shallow water and/or very shallow water applications.

The method 400 comprises a first step 402 of providing the end fitting 100 described above with reference to FIG. 1. The method comprises a second step 404 of locating the end 302 of the pipe P in the annular gap 106 extending between the stem 102 and the ferrule 104 (as shown in FIG. 3A), and a third step of delivering the medium 326 under pressure between the sleeve 116 and the stem 102 to move the sleeve radially and thereby clamp the end of the pipe between sleeve 116 and the stem (as shown in FIG. 3B). The pressure under which delivery is carried out will vary depending on the size of the pipe P, intended operating pressures/pressure rating and the particular medium being used for pressurisation. However, delivering the medium 326 under pressure may comprise delivering the medium 326 under a pressure in excess of 100 psi (~700 kPa) and/or up to 20,000 psi (~140 MPa). Particularly suitable pressures for delivering the medium 326 are between 8,000 psi and 15,000 psi. For a pipe P having the exemplary dimensions of the end fitting 100 described above, a suitable pressure for delivery of the medium 326 is 10,000 psi (70 MPa).

The method may comprise a fourth step 408 of maintaining pressure in the medium 326 for a predetermined period of time to fix the radial movement of the sleeve 116, i.e. to allow the pressurised medium 326 to set, or cure. Maintaining pressure in the medium 326 comprises maintaining a pressure in excess of 100 psi (~700 kPa) and/or up to 20,000 psi (~140 MPa). For the above referenced epoxy Belzona 1983, pressure may be held for approximately five minutes before the valve 128 is closed and the medium 326 is left to cure for up to 8 hours at approximately 65° C.

Delivery of the medium 326 may be carried out using standard pumping equipment, for example a piston accumulator, such as of types available from GS Global Resources, thereby negating the need for specialist, or heavy crimping or swaging machines.

The invention is not restricted to the details of any foregoing embodiments. It will be appreciated by those skilled in the art that several variations to the aforementioned embodiments are envisaged without departing from the scope of the invention, for example the pressurised medium may be supplied between the sleeve and the further sleeve through a single inlet.

The invention extends to any novel one, or any novel combination, of the features disclosed herein (including those of the accompanying claims and drawings). The claims should not be construed to cover merely the foregoing embodiments, but also any embodiments which fall within the scope of the claims.

All of the features disclosed herein (including those of the accompanying claims and drawings) may be combined in any combination, except combinations where at least some of such features are mutually exclusive. Moreover, each feature disclosed herein (including those of the accompanying claims and drawings) may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. An end fitting for connecting two sections of pipe to one another, the end fitting comprising:
    a first tubular member;
    a second tubular member disposed coaxially about the first tubular member to delimit an annular gap therebetween for receiving an end portion of a pipe; and
    a sleeve disposed coaxially about the first tubular member and within the annular gap such that a pressurised medium is receivable between the sleeve and the first tubular member to move at least a portion of the sleeve radially outward and thereby clamp the end portion of the pipe between the first and second tubular members when received in the annular gap, wherein the end fitting comprises a further sleeve disposed coaxially about the sleeve and within the annular gap such that a further pressurised medium is receivable between the further sleeve and the second tubular member to move at least a portion of the further sleeve radially inward to thereby clamp the end portion of the pipe.

2. An end fitting according to claim 1, wherein one of the first tubular member, the second tubular member and the sleeve comprise at least one of radially projecting teeth or knurls, surface undulations, recesses for O-rings, or combinations thereof.

3. An end fitting according to claim 1, wherein one of the first tubular member, the second tubular member and the sleeve comprise or is formed of at least one of a metallic material, steel, aluminium, copper brass, a reinforced or non-reinforced thermoplastic polymer, a reinforced or non-reinforced thermoset polymer, a composite material, or combinations thereof.

4. An end fitting according to claim 1, wherein the sleeve is sealingly attached to the first tubular member about a circumference thereof at a second location along the length of the first tubular member to provide a sealable enclosure for receiving the pressurised medium delimited, at least in part, by the sleeve and the first tubular member.

5. An end fitting according to claim 1, wherein the first tubular member or the sleeve comprises a valve for introducing the pressurised medium between the sleeve and the first tubular member.

6. A method of connecting an end fitting to an end of a pipe, the method comprising the steps of:
    providing an end fitting according to claim 1;
    locating an end portion of a pipe in the annular gap; and
    delivering a medium under pressure between the sleeve and the first tubular member and a further medium under pressure between the further sleeve and the second tubular member to move each of the at least a portion of the sleeve and the at least a portion of the further sleeve radially and thereby clamp the end of the pipe between the first and second tubular members.

7. The method of claim 6, wherein delivering the medium under pressure is commenced prior to commencing delivering the further medium under pressure.

8. The method of claim 6, wherein delivering the medium under pressure is completed prior to commencing delivering the further medium under pressure.

9. The method of claim 6, wherein delivering the medium under pressure comprises delivering the medium under a first pressure greater than a second pressure in delivering the further medium under pressure.

10. The method according to claim 6, wherein the medium and the further medium are substantially the same as one another.

11. An end fitting according to claim 1, wherein the sleeve is sealingly attached to the first tubular member about a circumference thereof at a first location along a length of the first tubular member.

* * * * *